(12) United States Patent
Nakaho

(10) Patent No.: US 6,900,605 B2
(45) Date of Patent: May 31, 2005

(54) MOTOR CONTROL CIRCUIT FOR MIRROR DEVICE

(75) Inventor: Junichi Nakaho, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 0 days.

(21) Appl. No.: 10/648,809

(22) Filed: Aug. 27, 2003

(65) Prior Publication Data

US 2004/0095088 A1 May 20, 2004

(30) Foreign Application Priority Data

Aug. 27, 2002 (JP) .................................... 2002-246622
Jul. 22, 2003 (JP) .................................... 2003-277621

(51) Int. Cl.[7] .............................................. H02P 1/00
(52) U.S. Cl. ..................... 318/280; 318/445; 318/434; 318/504
(58) Field of Search ..................... 363/132; 318/280, 318/445, 434, 504

(56) References Cited

U.S. PATENT DOCUMENTS 4,374,348 A 2/1983 Shimura et al.
2003/0076148 A1 * 4/2003 Tamiya et al. .............. 327/308
2003/0081440 A1 * 5/2003 Komatsu et al. ............ 363/132

FOREIGN PATENT DOCUMENTS

| JP | 08-142756 A | 6/1996 |
| JP | 8-207663 | 8/1996 |
| JP | 9-107691 | 4/1997 |
| JP | 10-278675 | 10/1998 |

OTHER PUBLICATIONS

European Search Report dated Nov. 3, 2004 in corresponding European Application No. EP 03 25 5282.

* cited by examiner

Primary Examiner—Karen Masih
(74) Attorney, Agent, or Firm—Nixon Peabody, LLP

(57) ABSTRACT

The present invention provides a mirror device motor control circuit that can reliably stop a mirror at predetermined positions with a simple configuration. In the control circuit of the invention, part of a lock current flowing to the motor flows to a base terminal of a transistor. Thus, as long as a voltage corresponding to the lock current is equal to or greater than a specific value, this voltage is applied to the base terminal of the transistor, whereby between a collector terminal and an emitter terminal becomes conductive, and the current flowing to a gate of a MOSFET is grounded via the collector terminal and the emitter terminal of the transistor. For this reason, when the lock current flows, conduction between a drain terminal and a base terminal of the MOSFET is released and a drive current of the motor is cut off.

11 Claims, 12 Drawing Sheets

MOTOR CONTROL CIRCUIT FOR MIRROR DEVICE

CROSS-REFERENCE TO RELATED APPLICATION

This application claims priority under 35USC 119 from Japanese Patent Application Nos. 2002-246622 and 2003-277621, the disclosures of which are incorporated by reference herein.

BACKGROUND OF THE INVENTION

1. Field of the Invention

The present invention relates to a motor control circuit for a mirror device used in an electric door mirror device or the like for a vehicle.

2. Description of the Related Art

Among rearview door mirrors disposed at the side of a door panel in correspondence with a driver seat or a passenger seat in a vehicle, there is an electric door mirror device where the door mirror can be folded and stored by the driving force of a motor so that the mirror faces a substantial vehicle width-direction interior.

This type of electric door mirror device is ordinarily disposed with a folding/deploying switch disposed near the driver seat in the vehicle. Power is supplied from the battery of the vehicle to a folding/deploying motor via the switch and a control circuit of the motor (see Japanese Patent Application Laid-Open (JP-A) No. 8-142756).

In the electric door mirror device, the control circuit is configured to stop the motor when the mirror has been rotated to a fixed deployed position and a fixed folded position. As an example of such a control circuit, there is a configuration that detects a load applied to the motor and cuts off current flowing to the motor when a load of a predetermined value or greater has been applied to the motor.

That is, the mirror is rotated to the deployed position or the folded position and further rotation thereof is restricted. Thus, when the motor is locked, a lock current that is larger than an ordinary activation current flows to the motor. The control circuit has a configuration that cuts off the current flowing to the motor when the lock current has flowed to the motor.

Although a relay circuit is used for the control circuit of the configuration that detects the lock current and cuts off the current flowing to the motor, a relay circuit usually has drawbacks in that the circuit scale is large and the circuit configuration is complicated.

SUMMARY OF THE INVENTION

In light of the above-described facts, it is an object of the present invention to obtain a mirror device motor control circuit that can reliably stop a mirror at predetermined positions with a simple configuration.

The present invention is a control circuit that is used in a mirror device, where the position of a mirror attached to a vehicle is changed in a predetermined direction by the driving force of a motor, and controls electrical power supplied to the motor, the control circuit comprising: a drive current controlling transistor where, when a first terminal is connected to a power source, a second terminal is connected to the motor and a voltage equal to or greater than a predetermined value is applied to a third terminal that is different from both the first and second terminals, a current flows from the first terminal to the second terminal and application of the voltage is released, whereby the current is blocked; and a switching transistor where a fourth terminal is connected between the power source and the third terminal, a fifth terminal is grounded, and which includes a sixth terminal connected to the motor at an opposite side from the second terminal, and a voltage equal to or greater than a specific value corresponding to a lock current flowing through the motor is applied to the sixth terminal, whereby the fourth terminal and the fifth terminal are switched to a conductive state and the voltage applied to the third terminal is made less than the predetermined value.

In the mirror device mirror control circuit of the above-described configuration, the drive current controlling transistor is intervened between the motor and the power source. The voltage equal to or greater than the predetermined value is applied to the third terminal of the drive current controlling transistor, whereby between the first terminal and the second terminal is placed in a conductive state, the current flows to the motor, and the motor is driven. The position of the mirror is changed by the driving force of the motor. For example, if the motor is a motor for storing and deploying the mirror, the position of the mirror is changed by the driving force of the motor from a storage position to a deployed position or from the deployed position to the storage position.

Also, as described above, the motor is driven and the position of the mirror is changed to the deployed position or the storage position so that, when further change in the position of the mirror is regulated by a stopper or the like, an output shaft of the motor is not rotated even if the drive current flows to the motor. Thus, the lock current flows to the motor and the value of the current flowing to the motor rises.

The sixth terminal of the switching transistor is connected at the opposite side from the second terminal of the motor, and the voltage corresponding to the current flowing through the motor is applied to the sixth terminal. Here, as described above, when the lock current flows and the voltage applied to the sixth terminal becomes equal to or greater than the predetermined value, the fourth terminal and the fifth terminal of the switching transistor are placed in a conductive state.

The fourth terminal of the switching terminal is connected between the power source and the third terminal of the drive current controlling transistor, and the fifth terminal is grounded. For this reason, when the fourth terminal and the fifth terminal of the switching transistor are placed in a conductive state, part or all of the current that had flowed to the third terminal is grounded via the fourth terminal and the fifth terminal of the switching transistor, and the voltage applied to the third terminal becomes less than the predetermined value. Thus, the drive current controlling transistor is switched to an OFF state and the current with respect to the motor is cut off.

In this manner, the present invention has a configuration that stops the motor on the basis of the lock current flowing to the motor. For this reason, miniaturization becomes possible with a simple configuration and costs are also lowered in comparison with a configuration that uses a relay circuit to cut off the current flowing to the motor at a position at which the motor is locked.

Moreover, the invention has a configuration that stops the motor on the basis of the lock current flowing to the motor. For this reason, when the invention is used to control a motor that stores and deploys a mirror, the invention can be applied to mirrors whose amount of displacement from the storage position to the deployed position differs, without having to fundamentally change the design of the circuit.

It should be noted that, in the present invention, the drive current controlling transistor and the switching transistor may be transistors of any configuration, including field-effect transistors. Also, in the present invention, the respective terminals in the drive current controlling transistor and the switching transistor are called first to sixth terminals. This is because, whereas the terminals are called base terminals, collector terminals and emitter terminals in common transistors, the terminals are called drain terminals, gate terminals and source terminals in field-effect transistors. In the present invention, the first to sixth terminals are not limited to terminals having such specific names.

The invention may also be disposed with a waveform conversion component that converts the waveform of the voltage applied to the sixth terminal, lowers a maximum value of an output voltage lower than a maximum value of a substantially pulse-like voltage equal to or greater than the inputted specific value, and inputs the maximum value to the sixth terminal.

In the mirror device motor control circuit of the above-described configuration, when the extemporaneous substantially pulse-like current such as an inrush current flows to the circuit immediately after activation of the motor has started, the voltage resulting from this current is applied to the sixth terminal of the switching transistor. However, in the present invention, this voltage is not directly applied to the sixth terminal; rather, the waveform of the voltage is converted by the waveform conversion component before it is applied to the sixth terminal.

Due to this conversion of the waveform, the voltage is lowered to less than the specific value—i.e., less than the value of the current necessary to make the fourth terminal and the fifth terminal conductive—and is outputted. Thus, a voltage equal to or greater than the predetermined value—i.e., equal to or greater than the value of the current necessary to make the first terminal and the second terminal conductive—can be applied to the third terminal of the drive current controlling transistor at the time, or immediately after, driving of the motor is initiated.

The invention may also be disposed with a compensation component that lowers, in accompaniment with the elapse of time, the voltage equal to or greater than the predetermined value on the basis of a current corresponding to the pulse-like voltage in a state where the pulse-like voltage equal to or greater than the specific value is applied to the sixth terminal.

In the mirror device motor control circuit of the above-described configuration, when the extemporaneous substantially pulse-like current such as an inrush current flows to the circuit immediately after activation of the motor has started, the voltage resulting from this current is applied to the sixth terminal of the switching transistor.

Thus, as long as this voltage is equal to or greater than the specific value, the fourth terminal and the fifth terminal of the switching transistor become conductive and the value of the current applied to the third terminal of the drive current controlling transistor falls below the predetermined value.

Here, in the present invention, as described above, when the extemporaneous substantially pulse-like current flows to the circuit, the compensation component applies the voltage corresponding to this substantially pulse-like current to the third terminal of the drive current controlling transistor. For this reason, the extemporaneous substantially pulse-like current flows to the circuit and conduction between the first terminal and the second terminal of the drive current controlling transistor during the time when the fourth terminal and the fifth terminal of the switching transistor are conductive can be secured. Thus, the motor can be reliably driven.

Because the compensation component applies the voltage to the third terminal while lowering the voltage in accompaniment with the elapse of time, the voltage that the compensation component applied to the third terminal falls below the predetermined value after a set period of time has elapsed, even if application of the voltage corresponding to the third terminal by the compensation component is initiated. For this reason, a voltage equal to or greater than the predetermined value can be prevented from being applied to the third terminal over a long period of time in a state where the fourth terminal and the fifth terminal of the switching transistor are conductive.

The invention may also be disposed with a bypass component where a voltage corresponding to the pulse-like current equal to or greater than the specific value is lowered in accompaniment with the elapse of time and applied, is switched to an ON state and grounds the pulse-like current proceeding to the third terminal before transmitting the pulse-like current to the third terminal.

In the mirror device motor control circuit of the above-described configuration, when the extemporaneous substantially pulse-like current such as an inrush current flows to the circuit immediately after activation of the motor has started, the voltage resulting from this current is applied to the sixth terminal of the switching transistor.

Thus, as long as this voltage is equal to or greater than the specific value, the fourth terminal and the fifth terminal of the switching transistor become conductive and the value of the current applied to the third terminal of the drive current controlling transistor falls below the predetermined value.

Here, in the present invention, as described above, when the extemporaneous substantially pulse-like current flows to the circuit, the voltage corresponding to this current is applied to the bypass component, whereby the bypass component is switched to the ON state. In the ON state of the bypass component, the current proceeding to the sixth terminal of the switching transistor is grounded before it reaches the sixth terminal. For this reason, even if the extemporaneous substantially pulse-like current flows, the motor can be reliably started without the fourth terminal and the fifth terminal of the switching transistor becoming conductive.

Moreover, because the voltage applied to the bypass component is lowered in accompaniment with the elapse of time, the bypass component is switched to the OFF state after the set period of time has elapsed. Thus, the voltage corresponding to the lock current can be applied to the sixth terminal.

The invention may also be disposed with a storage element that stores a charge due to the current flowing to the third terminal and reduces the current flowing to the third terminal in accordance with the amount of the stored charge.

In the mirror device motor control circuit of the above-described configuration, when the current equal to or greater than the predetermined value flows to the third terminal of the drive current controlling transistor, a charge is stored in the storage element connected to the third terminal. Moreover, when the charge stored in the storage element increases due to the current continuing to flow to the third terminal, the current flowing to the third terminal is reduced in accordance with the amount of the charge that the storage element has stored. Thus, eventually the voltage applied to the third terminal falls below the predetermined value, conduction between the first terminal and the second terminal is released, the drive current flowing to the motor is cut off, and the motor is stopped.

Here, the amount of the charge that the storage element stores during the period of time from when between the first terminal and the second terminal is placed in a conductive state to until the conduction is released is dependent on the time when the third terminal is placed in a conductive state. For this reason, the motor is fundamentally driven only for a set period of time from when the first terminal and the second terminal have been placed in a conductive state, and the position of the mirror is changed only by a set amount.

In this manner, in the present invention, because the motor is not driven for a period of time equal to or greater than the set period of time, the motor can be reliably stopped, even if the voltage equal to or greater than the specific value is not applied to the sixth terminal of the switching transistor in the event that an amount of time equal to or greater than the set period of time has elapsed.

As described above, the mirror device motor control circuit pertaining to the invention can miniaturize a configuration with a simple configuration and can reliably stop a mirror at predetermined positions.

DETAILED DESCRIPTION OF THE INVENTION

Configuration of First Embodiment

Figure 1:
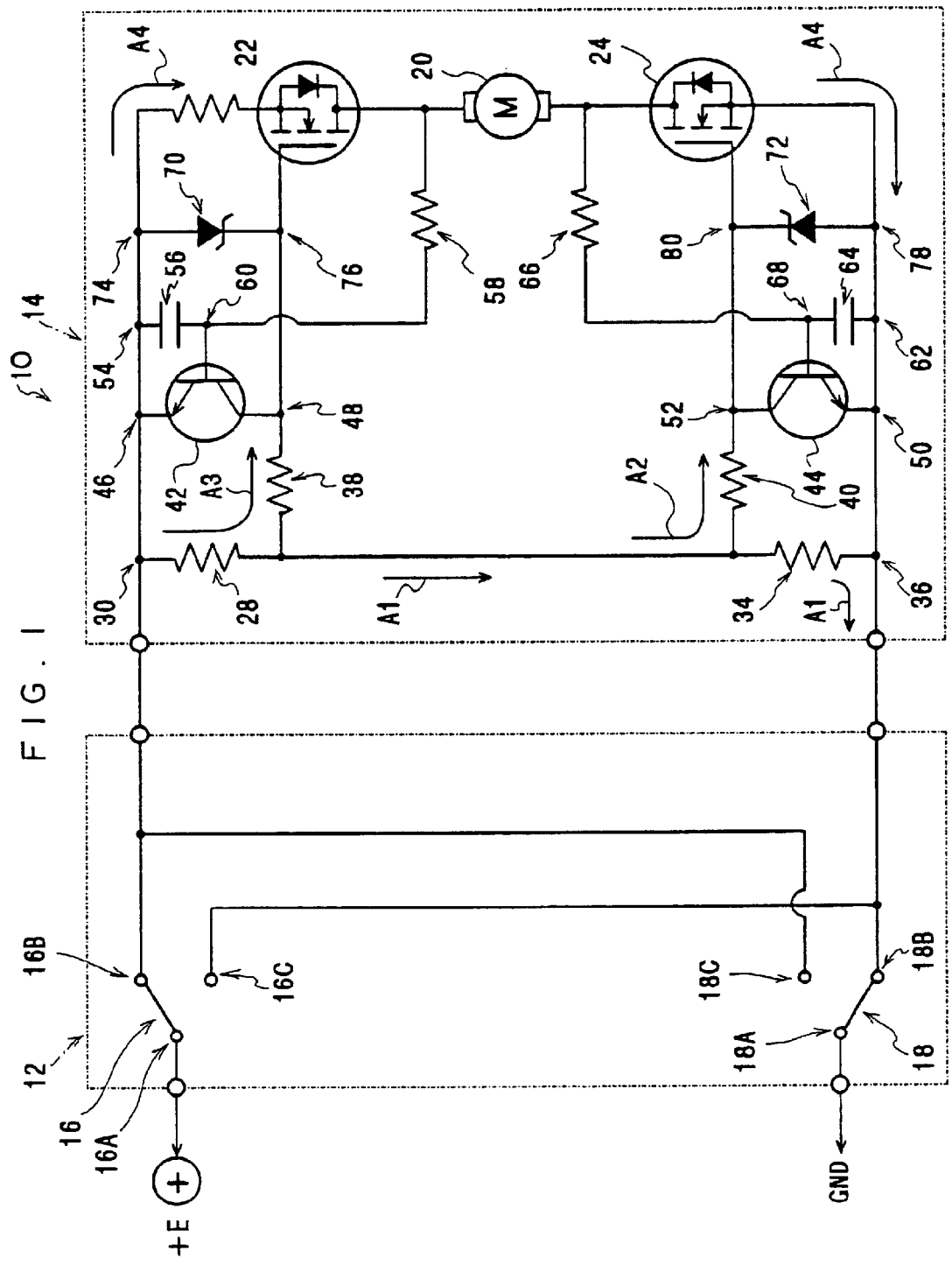
FIG. 1 is a circuit diagram of a mirror device motor control circuit pertaining to a first embodiment of the present invention.

In FIG. 1, the configuration of a mirror device motor control circuit 10 (referred to below simply as "the control circuit 10") pertaining to a first embodiment of the invention is illustrated by a circuit diagram.

As illustrated in this diagram, the present control circuit 10 is disposed with a switch section 12 and a drive control section 14. The switch section 12 is disposed with a pair of switches 16 and 18. The switch 16 is disposed with three terminals 16A, 16B and 16C, and is configured so that one of between the terminal 16A and the terminal 16B and between the terminal 16A and the terminal 16C is placed in a conductive state and the other is placed in a disconnected state.

The switch 18 is similarly disposed with three terminals 18A, 18B and 18C, and is configured so that one of between the terminal 18A and the terminal 18B and between the terminal 18A and the terminal 18C is placed in a conductive state and the other is placed in a disconnected state. However, whereas the terminal 16A of the switch 16 is connected to the positive terminal of a battery installed in the vehicle, the terminal 18A of the switch 18 is grounded. Also, in the switches 16 and 18, the terminal 16B is connected to the terminal 18C and the terminal 16C is connected to the terminal 18B.

Moreover, the switches 16 and 18 are set so as mutually interwork. When the terminal 16A and the terminal 16B are connected by the switch 16, the terminal 18A and the terminal 18B are connected by the switch 18, and when the terminal 16A and the terminal 16C are connected by the switch 16, the terminal 18A and the terminal 18C are connected by the switch 18.

Figure 4:
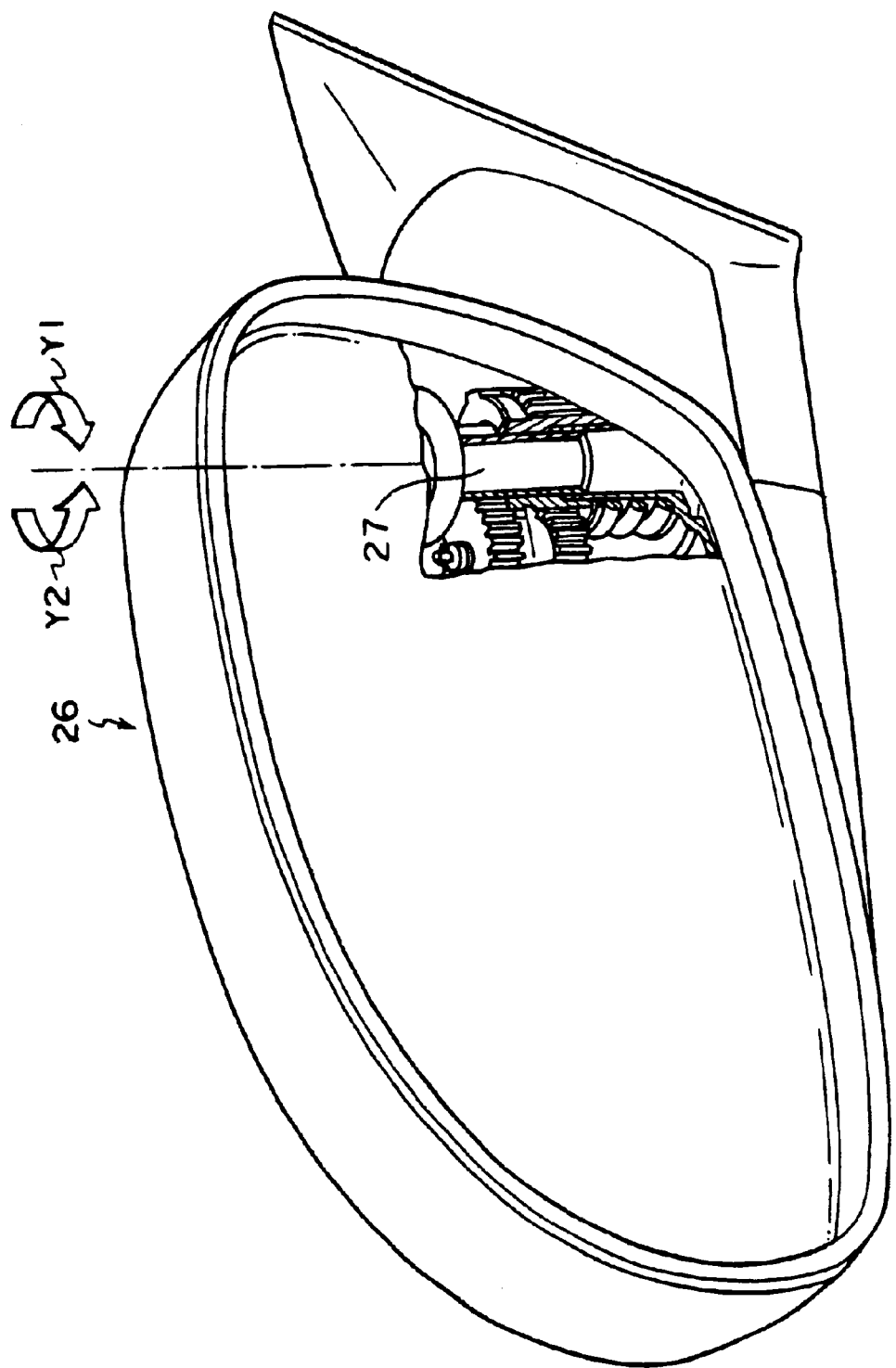
FIG. 4 is a perspective view of a mirror device.

The drive control section 14 is disposed with a motor 20 and a pair of n-channel field-effect transistors 22 and 24 (referred to below simply as "the MOSFETs 22 and 24") respectively serving as drive current controlling transistors. The motor 20 is housed at an inner side of a door mirror 26 serving as the mirror shown in FIG. 4. An output shaft is directly or indirectly and mechanically connected to a support shaft 27 that rotatably supports, using the substantial vertical direction of the vehicle as an axial direction, the door mirror 26 around this axis. Due to the output shaft rotating, the door mirror 26 is rotated in a deployment direction (the direction of arrow Y1 in FIG. 4) or a storage direction (the direction of arrow Y2 in FIG. 4).

One terminal of the motor 20 is connected to a drain terminal serving as a second terminal of the MOSFET 22. In the MOSFET 22, a source terminal serving as a first terminal is connected to the terminal 16B of the switch 16 and to the terminal 18C of the switch 18. With respect thereto, the other terminal of the motor 20 is connected to a drain terminal serving as a second terminal of the MOSFET 24. In the MOSFET 24, a source terminal serving as a first terminal is connected to the terminal 16C of the switch 16 and to the terminal 18B of the switch 18.

The drive control section 14 is also disposed with a resistor 28. One end of the resistor 28 is connected to a contact point 30 between the terminal 16B of the switch 16 and the terminal 18C of the switch 18 and the source terminal of the MOSFET 22. The other end of the resistor 28 is connected to an end of a resistor 34. Moreover, the other end of the resistor 34 is connected to a contact point 36 between the source terminal of the MOSFET 24 and the terminal 18B of the switch 18 and the terminal 16C of the switch 16.

The other end of the resistor 28 is also connected to a terminal of a resistor 38. The other end of the resistor 38 is connected to a gate terminal serving as a third terminal of the MOSFET 22. Moreover, the other end of the resistor 28 is connected to an end of a resistor 40 between the other end of the resistor 28 and the end of the resistor 34. The other end of the resistor 40 is connected to a gate terminal serving as a third terminal of the MOSFET 24.

Moreover, the drive control section 14 is disposed with a pair of NPN transistors 42 and 44 respectively serving as switching transistors. In the transistor 42, an emitter terminal serving as a fifth terminal is connected to a contact point 46 between the contact point 30 and the source terminal of the MOSFET 22, and a collector terminal serving as a fourth terminal is connected to a contact point 48 between the resistor 38 and the gate terminal of the MOSFET 22. In the transistor 44, an emitter terminal serving as a fifth terminal is connected to a contact point 50 between the contact point 36 and the source terminal of the MOSFET 24, and a collector terminal serving as a fourth terminal is connected to a contact point 52 between the resistor 40 and the gate terminal of the MOSFET 24.

An end of a capacitor 56 configuring a waveform conversion component is connected to a contact point 54 between the contact point 46 and the source terminal of the MOSFET 22. The other end of the capacitor 56 is connected to a terminal of the motor 20 via a resistor 58 configuring a waveform conversion component together with the capacitor 56, and a base terminal serving as a sixth terminal of the transistor 42 is connected to a contact point 60 between the capacitor 56 and the resistor 58.

With respect thereto, an end of a capacitor 64 configuring a waveform conversion component is connected to a contact point 62 between the contact point 50 and the source terminal of the MOSFET 24. The other end of the capacitor 64 is connected to the other terminal of the motor 20 via a resistor 66 configuring a waveform conversion component together with the capacitor 64, and a base terminal serving as a sixth terminal of the transistor 44 is connected to a contact point 68 between the capacitor 64 and the resistor 66.

The drive control section 14 is also disposed with zener diodes 70 and 72. One end of the zener diode 70 is connected to a contact point 74 between the contact point 54 and the source terminal of the MOSFET 22, and the other end of the zener diode 70 is connected to a contact point 76 between the contact point 48 and the gate terminal of the MOSFET 22.

In the zener diode 70, a current can ordinarily flow from one end to the other end, but the current cannot flow in the opposite direction. However, a large current flows from the other end to the one end by a zener effect only when a voltage of a predetermined size or greater is applied to the other end of the zener diode 70.

One end of the zener diode 72 is connected to a contact point 78 between the contact point 62 and the source terminal of the MOSFET 24, and the other end of the zener diode 72 is connected to a contact point 80 between the contact point 52 and the gate terminal of the MOSFET 24. In the zener diode 72 also, similar to the zener diode 70, a current can ordinarily flow from one end to the other end, but the current cannot flow in the opposite direction. However, a large current flows from the other end to the one end by a zener effect only when a voltage of a predetermined size or greater is applied to the other end of the zener diode 72.

Action and Effects of the First Embodiment

Next, the action and effects of the present embodiment will be described.

As shown in FIG. 1, in the present control circuit 10, when the terminal 16A and the terminal 16B of the switch 16 are connected, the terminal 18A and the terminal 18B of the switch 18 are connected in conjunction therewith, whereby a current A1 flows from the terminal 16A to the terminal 18B via the resistors 28 and 34.

Moreover, a current A2 corresponding to the voltage of both ends of the resistor 34 at this time flows to the resistor 40, and a voltage Vg corresponding to the voltage of both ends of the resistor 34 is applied to the gate terminal of the MOSFET 24. When the voltage Vg is greater than a predetermined value Vg1, between the drain terminal and the source terminal of the MOSFET 24 is switched to an ON state, and it becomes possible for current to flow from the drain terminal to the source terminal.

At this time, a current A3 flows from the resistor 28 to the resistor 38, and a voltage corresponding to the voltage of both ends of the resistor 28 is applied to the gate terminal of the MOSFET 22. Thus, although between the drain terminal and the source terminal of the MOSFET 22 is switched to an ON state and it becomes possible for the current to flow from the drain terminal to the source terminal, in the MOSFET 22, it is possible for the current to flow from the source terminal to the drain terminal by a parasitic diode effect.

Thus, a drive current A4 flows to the motor 20, the motor 20 is driven, and the door mirror 26 is rotated in the storage direction (the direction of arrow Y2 in FIG. 4) by this driving force.

In this state, the door mirror 26 reaches the storage position and rotation of the door mirror 26 is restricted by a stopper member and the vehicle body, whereby rotation of the door mirror 26 is forcibly stopped. In this manner, when the motor 20 is energized in a state where the rotation of the door mirror 26 has been forcibly stopped, the motor 20 becomes locked and the lock current flows. As shown in the time chart of FIG. 3, when the motor 20 is locked after a predetermined period of time T3 has elapsed from an activation starting time T0 of the motor 20, the lock current gradually increases and the voltage applied to the motor 20 rises in accompaniment therewith.

Figure 2:
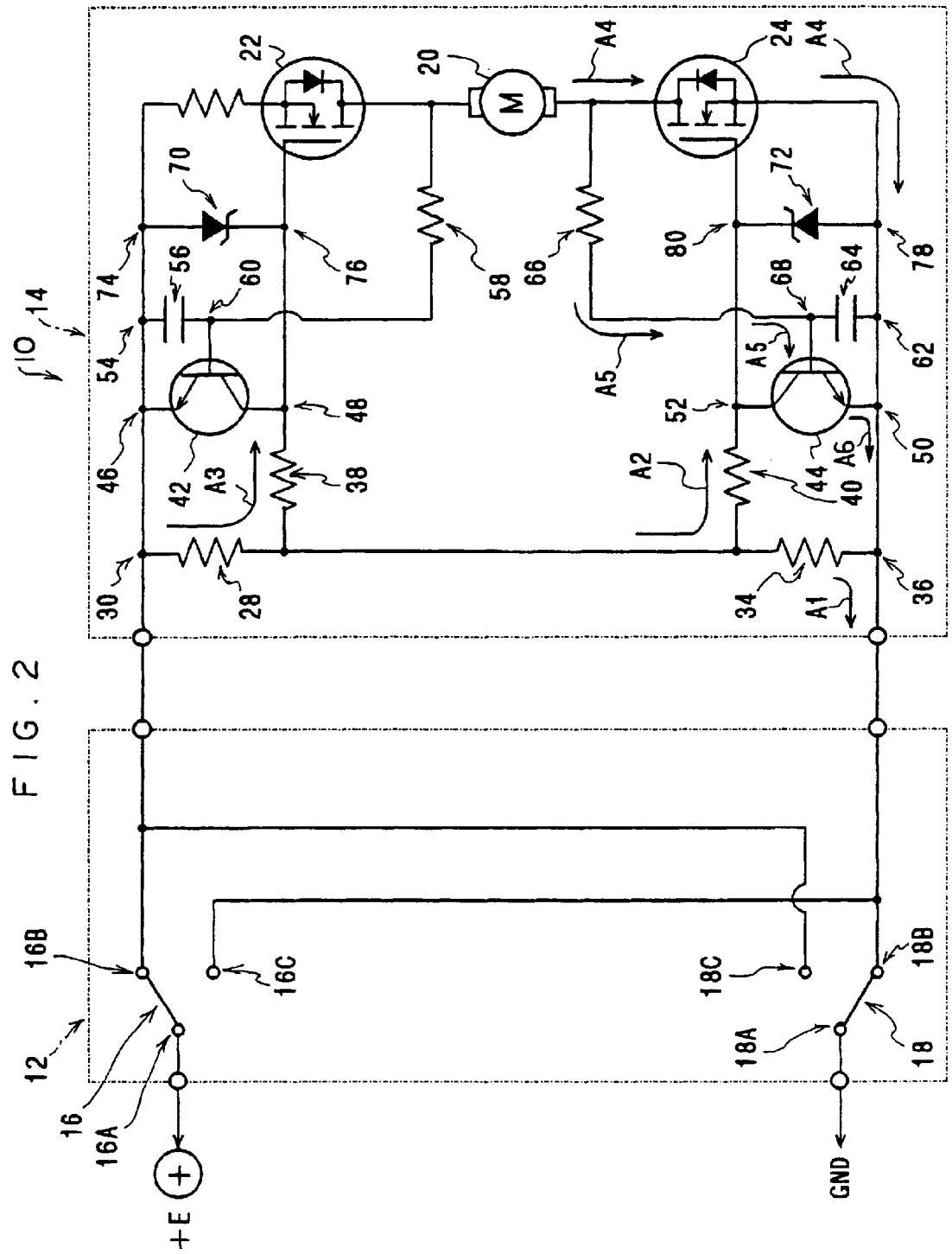
FIG. 2 is a circuit diagram corresponding to FIG. 1 in a state where a lock current is flowing.

As shown in FIG. 2, part of the current A4 flowing through the motor 20 becomes a current A5 and flows to the resistor 66, and a voltage Vb corresponding to the current A5 is applied to the base terminal of the transistor 44. Thus, the lock current also similarly flows to the resistor 66, and the voltage Vb corresponding to the lock current is applied to the base terminal of the transistor 44.

Figure 3:
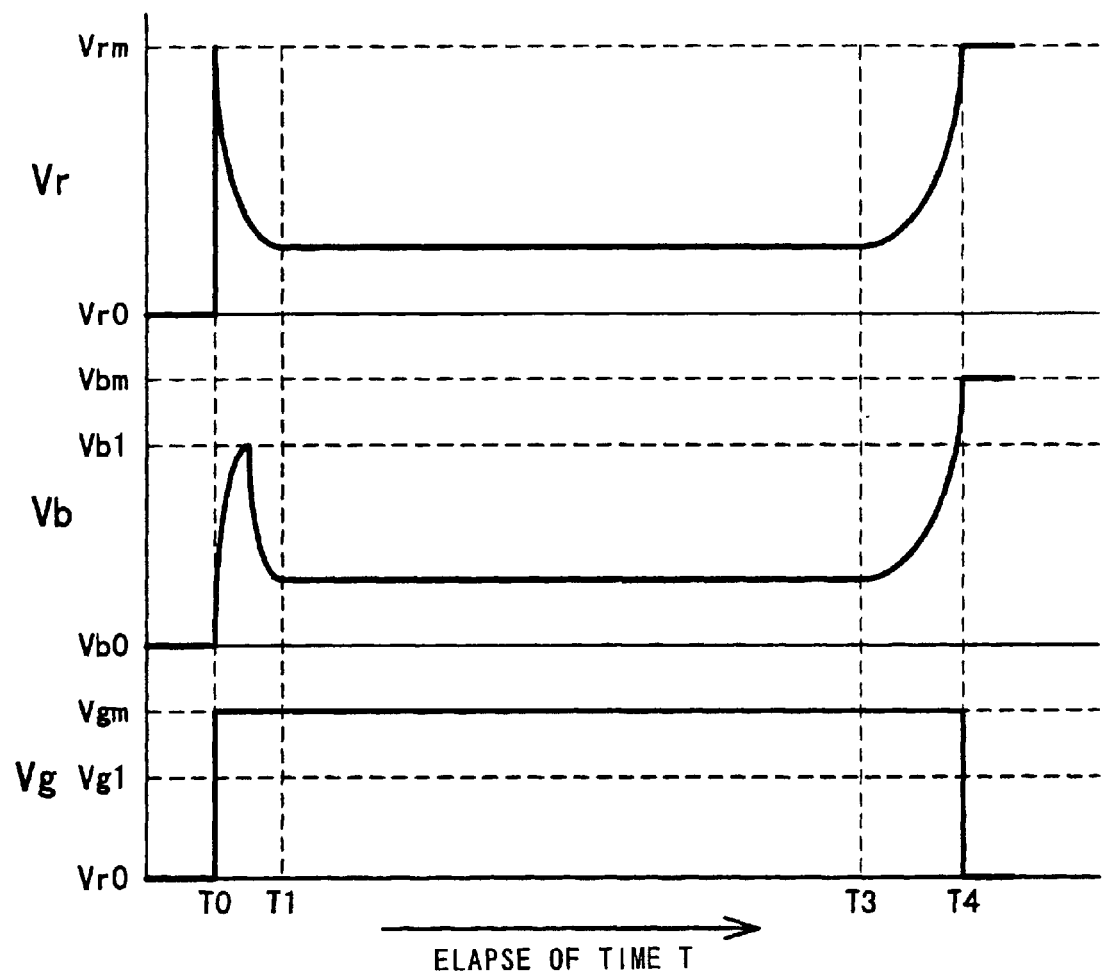
FIG. 3 is a time chart showing waveforms of voltages applied to each of a third terminal of a drive current controlling transistor and a sixth terminal of a switching transistor.

As described above, because the lock current gradually increases, as shown in the time chart of FIG. 3, a predetermined period of time T4 elapses and the voltage Vb also increases in accompaniment with the increase in a voltage Vr. Moreover, when the lock current reaches a specific size so that the voltage Vr reaches a voltage Vrm corresponding to this, the voltage Vb reaches a specific value Vbm, whereby between the collector terminal and the emitter terminal of the transistor 44 becomes conductive.

In this manner, because between the collector terminal and the emitter terminal of the transistor 44 becomes conductive, as shown in FIG. 2, the current A2 that had flowed to the gate terminal of the MOSFET 24 until then becomes a current A6 and is grounded via the collector terminal and the emitter terminal of the transistor 44. Thus, the current A2 flowing to the gate terminal of the MOSFET 24 is reduced or eliminated, and the voltage Vg applied to the gate terminal of the MOSFET 24 becomes lower than the predetermined value Vg1. For this reason, between the drain terminal and the source terminal of the MOSFET 24 is cut off and the supply of current to the motor 20 is cut off.

As described above, in the present control circuit 10, the voltage Vbm corresponding to the lock current of a predetermined value or greater flowing to the motor 20 is applied to the base terminal of the transistor 44, whereby the supply of current to the motor 20 can be cut off. Moreover, because the transistor 44 can be disposed on the same circuit board as the circuit board disposed with the MOSFET 24 and the like, overall miniaturization can be accomplished and costs also become lower in comparison with a configuration disposed with a relay circuit.

Immediately after the terminal 16A and the terminal 16B of the switch 16 and the terminal 18A and the terminal 18B of the switch 18 are connected, a pulse-like inrush current that is larger than the ordinary drive current of the motor 20 flows. Thus, as shown in the time chart of FIG. 3, the voltage Vr applied to the motor 20 also becomes larger than that of the ordinary drive time (i.e., after the predetermined period of time T1 elapses) until the predetermined period of time T1 elapses from the drive starting time T0 of the motor 20.

Naturally, after the inrush current has flowed through the motor 20, the inrush current flows through the resistor 66 and proceeds to the capacitor 64 and the base terminal of the transistor 44, and the voltage Vb of a size corresponding to the inrush current is applied to the base terminal of the transistor 44.

As long as the size of the voltage Vb corresponding to the inrush current is equal to or greater than the specific value Vbm, there is conduction between the collector terminal and the emitter terminal of the transistor 44. Thus, in this state, the voltage Vg applied to the gate terminal of the MOSFET 24 does not become equal to or greater than the predetermined value Vg1, and between the drain terminal and the source terminal of the MOSFET 24 is cut off.

In the present control circuit 10, the resistor 66 and the capacitor 64 configure an "integration circuit (delay circuit) ". For this reason, the waveform of the voltage Vb applied to the base terminal of the transistor 44 is converted when the substantially pulse-like inrush current flows. That is, the waveform of the voltage Vb is changed from a pulse to a waveform that gradually increases in accompaniment with the elapse of time.

Thus, even if the inrush current flows to the present control circuit 10, a maximum value Vb1 of the voltage Vb applied to the base terminal of the transistor 44 does not reach the specific value Vbm. Moreover, because the current value is rapidly reduced after the inrush current reaches a peak as a substantial pulse, the maximum value Vb1 of the voltage Vb resulting from the inrush current does not reach the specific value Vbm during the period of time from after the inrush current flows to until the predetermined period of time T1 elapses.

Thus, in the present control circuit 10, the voltage Vb applied to the base terminal of the transistor 44 is not conducted between the collector terminal and the emitter terminal of the transistor 44 at the time driving of the motor is started and immediately thereafter, even if the inrush current flows. For this reason, the current A2 can be reliably oriented to the gate terminal of the MOSFET 24 and the voltage Vg corresponding to the current A2 can be reliably applied to the gate terminal of the MOSFET 24, and conduction can be reliably achieved between the drain terminal and the source terminal of the MOSFET 24 so that the motor 20 can be driven.

As shown in FIG. 1, in the present control circuit 10, the circuit configuration between the switch 16 side (upper half of FIG. 1 with the motor 20 as a boundary) and the switch 18 side (lower half of FIG. 1 with the motor 20 as a boundary) is symmetrical via the motor 20. Thus, when the terminal 16A and the terminal 16C of the switch 16 are connected and the terminal 18A and the terminal 18C of the switch 18 are connected, the transistor 42, the resistor 58 and the capacitor 56 provide the same action as the transistor 44, the resistor 66 and the capacitor 64. For this reason, the same effect can be obtained even when the door mirror 26 is deployed from the storage position.

Second Embodiment

Next, other embodiments of the invention will be described. It should be noted that, for the purpose of describing the embodiments below, the same reference numerals will be given to parts that are fundamentally the same as those in embodiments preceding the embodiment being described, including the first embodiment, and that description of those parts will be omitted.

Figure 5:
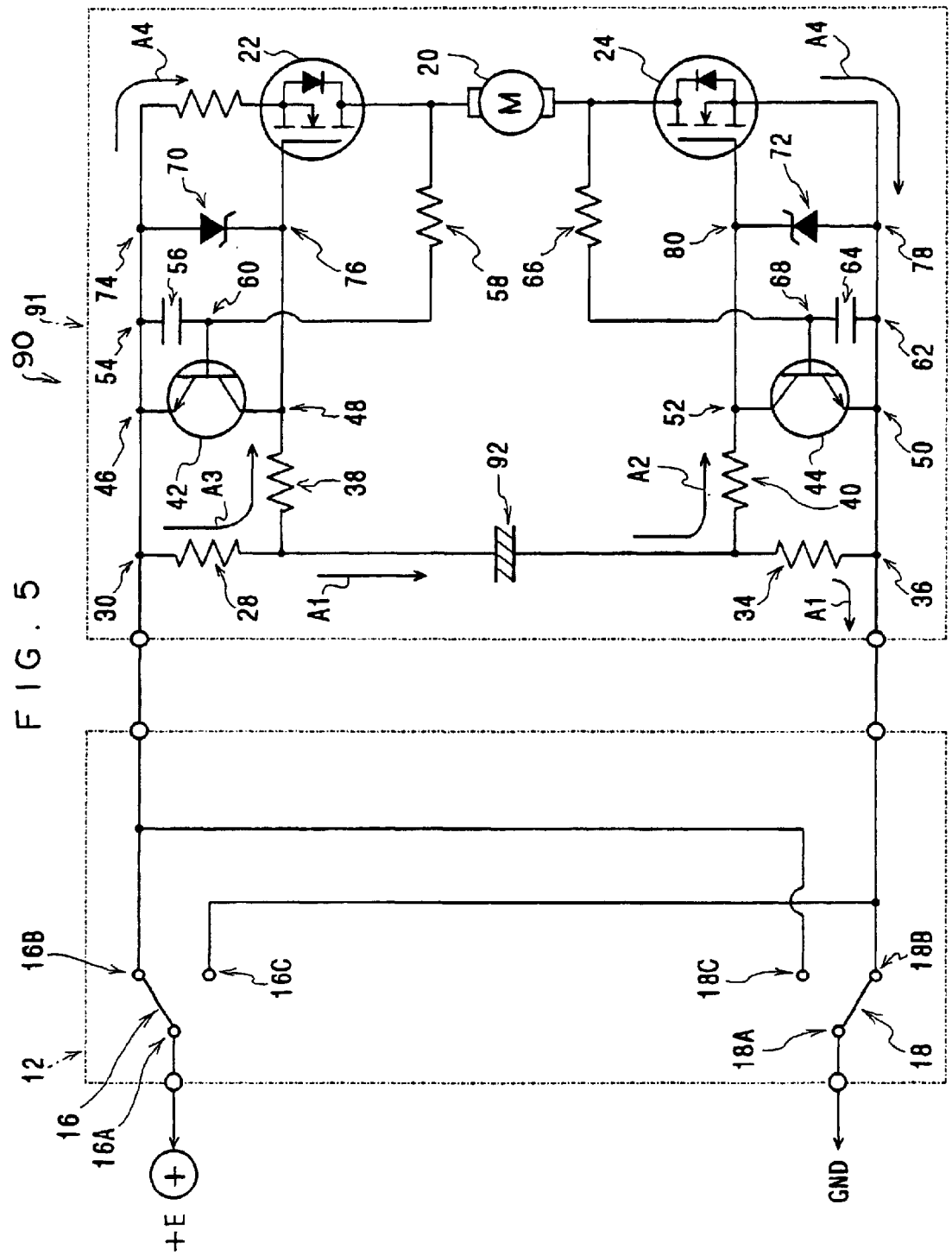
FIG. 5 is a circuit diagram of a mirror device motor control circuit pertaining to a second embodiment of the present invention.

In FIG. 5, a circuit diagram of a mirror device motor control circuit 90 (referred to below simply as "the control circuit 90") pertaining to a second embodiment of the invention is illustrated.

As illustrated in this diagram, a drive control section 91 of the present control circuit 90 is disposed with a capacitor 92 serving as a storage terminal. An end of the capacitor 92 is connected between the resistor 28 and the resistor 38, and the other end of the capacitor 92 is connected between the resistor 34 and the resistor 40.

Because the present control circuit 90 disposed with the capacitor 92 in this manner is the same as the control circuit 10 pertaining to the first embodiment excluding the capacitor 92, the control circuit 90 fundamentally provides the same action as that of the first embodiment, and the same effects can be obtained.

However, by disposing the capacitor 92 in the present control circuit 90, a charge is stored in the capacitor 92 when the current A1 flows due to the terminal 18A and the terminal 18B of the switch 18 being connected when the terminal 16A and the terminal 16B of the switch 16 are connected.

Figure 6:
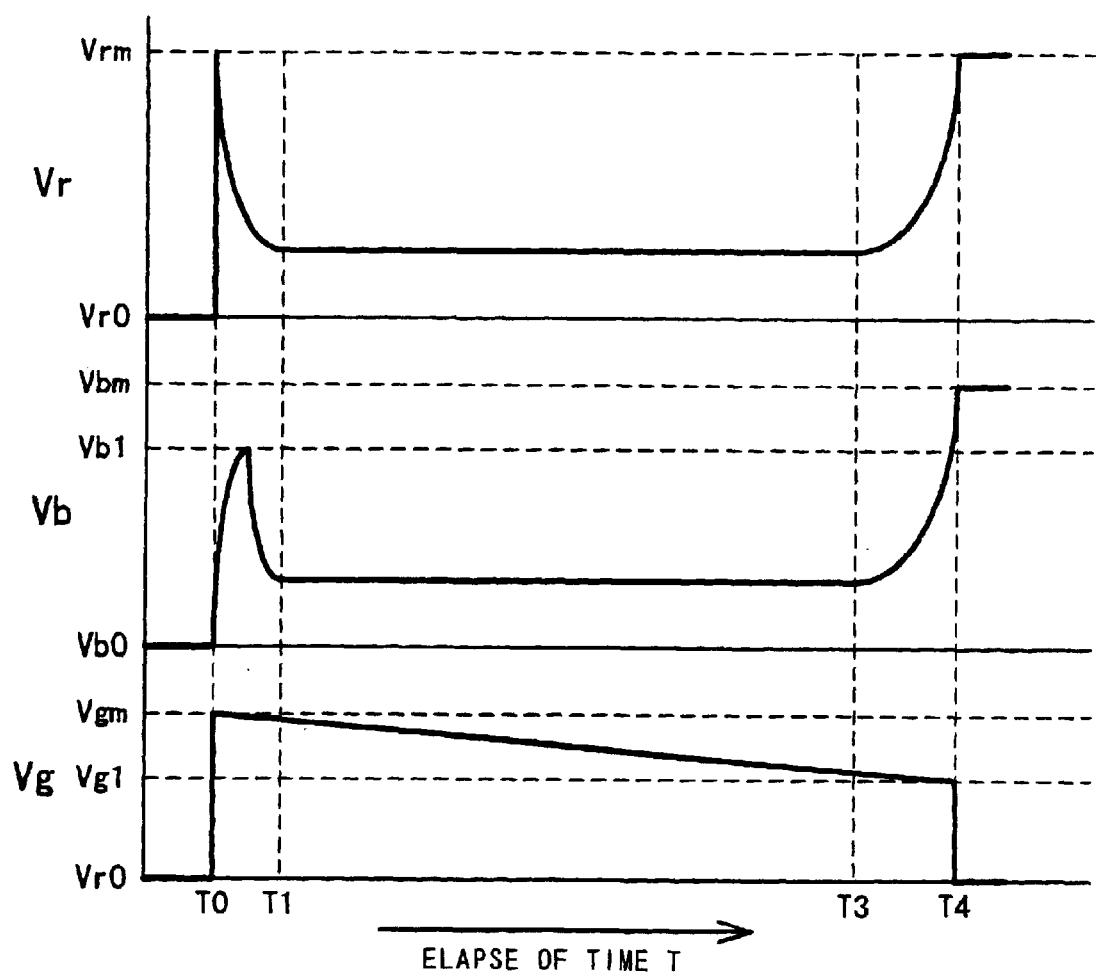
FIG. 6 is a time chart showing waveforms of voltages applied to each of a third terminal of a drive current controlling transistor and a sixth terminal of a switching transistor.

As shown in FIG. 5, the gate terminal of the MOSFET 24 is connected to the capacitor 92 via the resistor 40, whereby the current value of the current gradually flowing to the gate terminal of the MOSFET 24 is reduced in accordance with the charge that the capacitor 92 has stored. Thus, as shown in the time chart of FIG. 6, the voltage Vg acting on the gate terminal of the MOSFET 24 gradually drops in accompaniment with the elapse of time.

For this reason, when the predetermined period of time—i.e., the period of time that the door mirror 26 is rotated until the storage position-elapses and the voltage Vg becomes equal to or less than the predetermined value Vg1, conduction between the drain terminal and the source terminal of the MOSFET 24 is released. Thus, in this state, conduction to the motor 20 is forcibly cut off, the driving of the motor 20 is stopped, and the door mirror 26 stops rotating at the storage position.

In this manner, in the present control circuit 90, because the motor 20 is forcibly stopped not only when the lock current has reached the predetermined value or greater but also due to the predetermined period of time elapsing, drawbacks arising due to the lock current acting for a long period of time on the motor 20 and the MOSFETs 22 and 24 can be prevented.

Configuration of Third Embodiment

Next, a third embodiment of the invention will be described.

Figure 7:
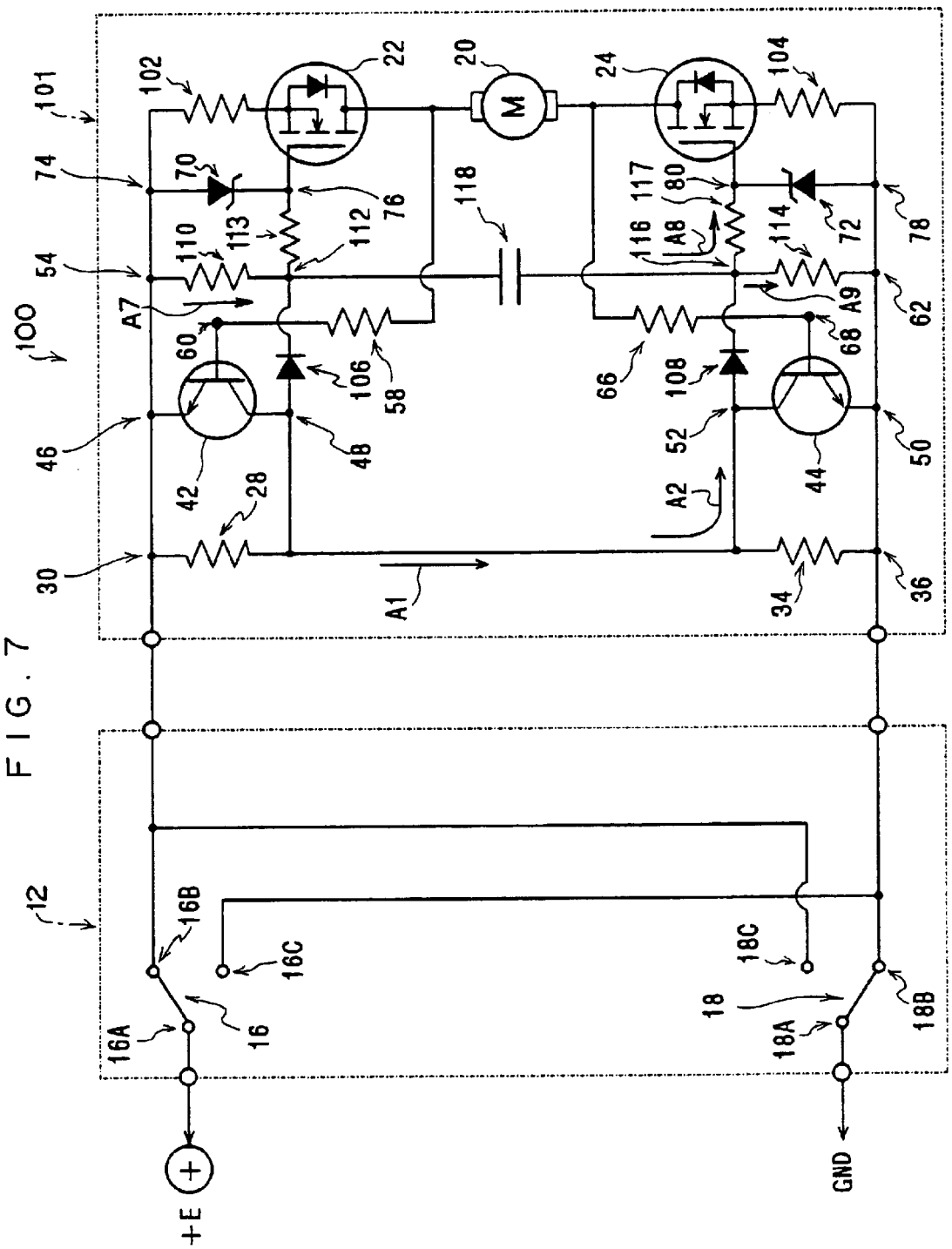
FIG. 7 is a circuit diagram of a mirror device motor control circuit pertaining to a third embodiment of the present invention.

In FIG. 7, the configuration of a mirror device motor control circuit 100 (referred to below simply as "the control circuit 100'') pertaining to the present embodiment of the invention is illustrated by a circuit diagram.

As illustrated in this diagram, in the present control circuit 100, in contrast to the control circuit 10 pertaining to the first embodiment, a resistor 102 is disposed between the contact point 74 and the drain terminal of the MOSFET 22, and a resistor 104 is disposed between the contact point 78 and the drain terminal of the MOSFET 24.

Also, the resistors 38 and 40 are not disposed in the control circuit 100, the other end of the resistor 28 and the contact point 48 are directly connected, and the other end of the resistor 34 and the contact point 52 are directly connected.

Moreover, a diode 106 is disposed between the contact point 48 and the contact point 76, and the orientation of the current between the contact point 48 and the contact point 76 is restricted to an orientation from the contact point 48 to the contact point 76. Similarly, a diode 108 is disposed between the contact point 52 and the contact point 80, and the orientation of the current between the contact point 52 and 80 is restricted to an orientation from the contact point 52 to the contact point 80.

Also, in the present control circuit 100, the capacitor 56 is not disposed between the contact point 54 and the contact point 60, and the contact point 54 and the contact point 60 are not connected. Thus, the other end of the resistor 58 is connected only to the base terminal of the transistor 42. However, an end of a resistor 110 configuring a compensation component is connected to the contact point 54. The other end of the resistor 110 is connected to a contact point 112 between the diode 106 and the contact point 76. Moreover, a resistor 113 is disposed between the contact point 76 and the contact point 112.

The capacitor 64 is not disposed between the contact point 62 and the contact point 68, and the contact point 62 and the contact point 68 are not connected. Thus, the other end of the resistor 66 is connected only to the base terminal of the transistor 44. However, an end of a resistor 114 configuring a compensation component is connected to the contact point 62. The other end of the resistor 114 is connected to a contact point 116 between the diode 108 and the contact point 80. Moreover, a resistor 117 is disposed between the contact point 80 and the contact point 116.

Moreover, an end of a capacitor 118 configuring a compensation component is connected to the contact point 112, and the other end of the capacitor 118 is connected to the contact point 116.

Action and Effects of the Third Embodiment

In the present control circuit 100 of the above configuration, when the terminal 16A and the terminal 16B of the switch 16 are connected and the terminal 18A and the terminal 18B of the switch 18 are connected, the current A2 separated from the current A1 flows to the diode 108 and proceeds to the gate terminal of the MOSFET 24. Also, in this state, a current A7 proceeding to the resistor 110 via the contact points 30, 46 and 54 flows. After the current A7 has flowed from the resistor 110 to the capacitor 118, it is separated into a current A8, which proceeds to the gate terminal of the MOSFET 24, and a current A9, which proceeds to the resistor 114.

Thus, in this state, the voltage Vg based on the current A2 and the current A8 is applied to the gate terminal of the MOSFET 24 and the voltage Vg exceeds the predetermined value Vgm, whereby between the drain terminal and the source terminal of the MOSFET 24 becomes conductive and the drive current flows to the motor 20. Thus, the driving of the motor 20 starts.

The lock current of a specific size or greater flows to the motor 20, and when the voltage Vb corresponding to the lock current becomes the specific value Vbm or greater and is applied to the base terminal of the transistor 44, between the collector terminal and the emitter terminal of the transistor 44 becomes conductive, and part or all of the current A2 passes through the collector terminal and the emitter terminal of the transistor 44 and is grounded. Thus, because the voltage Vg that had been applied to the gate terminal of the MOSFET 24 until then drops or is eliminated, conduction between the drain terminal and the source terminal of the MOSFET 24 is released and conduction with respect to the motor 20 is cut off.

In this manner, in the present control circuit 100, the voltage Vb corresponding to the lock current applied to the base terminal of the transistor 44 becomes equal to or greater than the specific value Vbm, whereby conduction with respect to the motor 20 is cut off. Thus, the same effects as those of the first embodiment can be obtained.

Incidentally, as described earlier, the substantially pulse-like inrush current flows immediately after driving of the motor 20 is initiated. Here, in the present control circuit 100, part of the inrush current proceeds to the base terminal of the transistor 44 via the resistor 66, and the voltage Vb resulting from this inrush current is applied to the base terminal.

Figure 8:
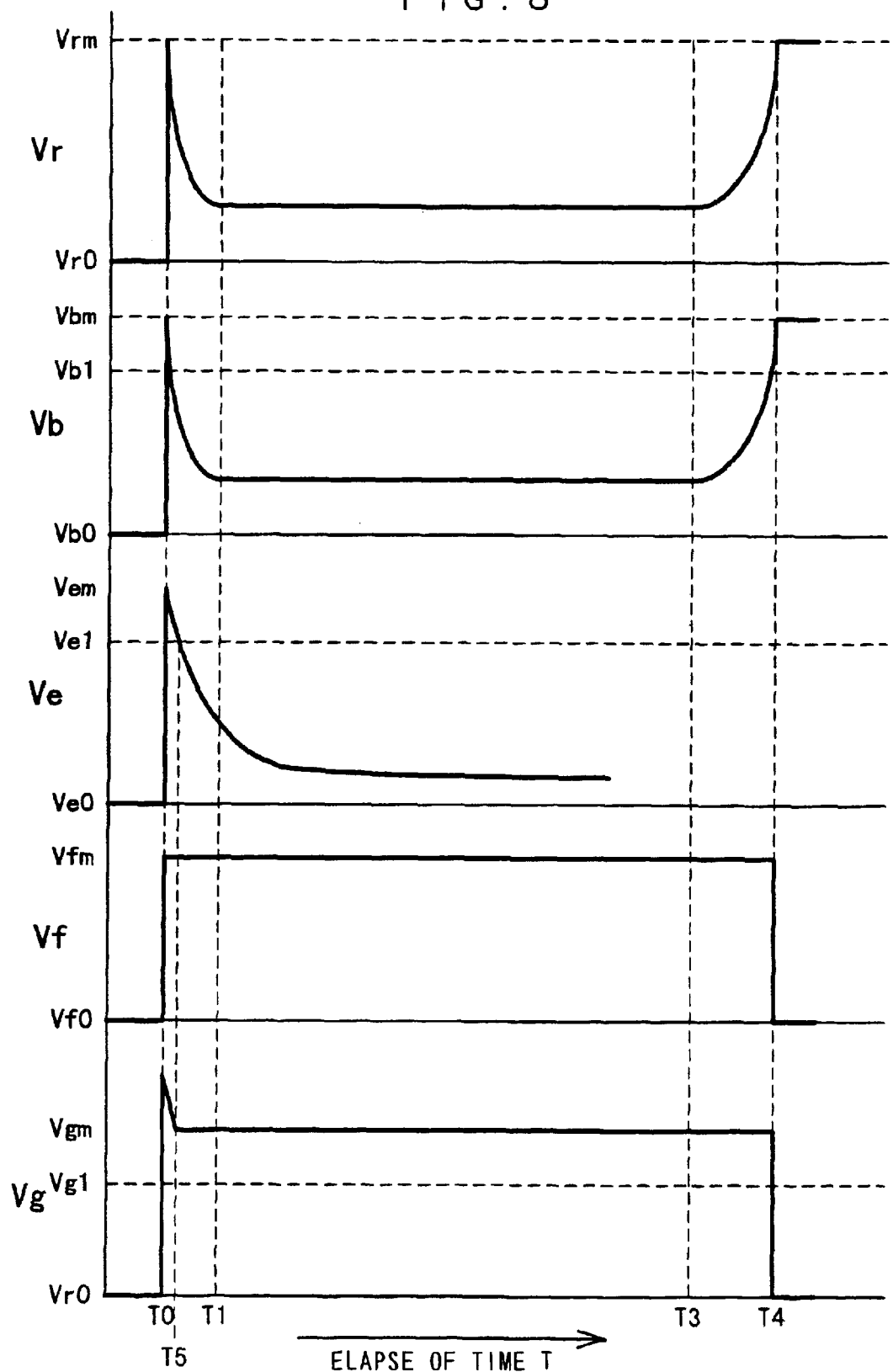
FIG. 8 is a time chart showing waveforms of voltages applied to each of a third terminal of a drive current controlling transistor and a sixth terminal of a switching transistor.

However, as shown in the time chart of FIG. 8, in contrast to the first embodiment, because the capacitor 64 is not disposed, the waveform of the voltage Vb resulting from the inrush current applied to the base terminal of the transistor 44 becomes a substantial pulse, and does not become a waveform that gradually rises as in the first embodiment. For this reason, the voltage Vb is applied to the base terminal of the transistor 44, whereby between the collector terminal and the emitter terminal of the transistor 44 becomes conductive, and part or all of the current A2 is grounded.

The inrush current proceeds to the resistor 114 via the zener diode 70 and the resistor 113. A voltage Ve between both ends of the resistor 114 at the time the inrush current has flowed rises extemporaneously to a maximum value Vem. Here, because the contact point 116 between the capacitor 118 and the resistor 114 is connected to the gate terminal of the MOSFET 24, the current flows for a set period of time and the voltage between both ends of the resistor 114 becomes equal to or greater than a set value. Thus, regardless of the state of the transistor 44, the voltage Vg corresponding to the voltage Vem is applied to the gate terminal of the MOSFET 24. Because the voltage Vg corresponding to the voltage Vem exceeds the predetermined value Vgm, between the drain terminal and the source terminal of the MOSFET 24 becomes conductive.

Also, because the inrush current is substantially pulse-like and the integration circuit is configured by the resistor 110 and the capacitor 118, the voltage Ve between both ends of the resistor 114 gradually drops after it reaches the maximum value Vem. However, because the voltage Vg corresponding to the maximum value Vem exceeds the predetermined value Vgm, a predetermined period of time T5 (less than T1) is necessary during the period of time until the voltage Vg corresponding to the dropping voltage Ve becomes equal to the predetermined value Vgm.

As described above, because the inrush current is substantially pulse-like, the voltage Vb corresponding to the inrush current applied to the base terminal of the transistor 44 rapidly drops after reaching the maximum value Vbm, and falls below the voltage Vb1 necessary for conduction between the collector terminal and the emitter terminal of the transistor 44. Thus, until the voltage Vb resulting from the inrush current becomes less than the specific value Vb1, the voltage Vg corresponding to the voltage Ve is applied to the gate terminal of the MOSFET 24 and conduction is allowed between the drain terminal and the source terminal, whereby conduction is continuously allowed between the drain terminal and the source terminal of the MOSFET 24 during the period of time until the predetermined time T1 from the drive starting time T0 of the motor 20 to until the inrush current stops flowing elapses.

That is, even in the present control circuit 100, the driving of the motor 20 can be reliably started similar to the first embodiment.

It should be noted that, as shown in FIG. 7, even in the present control circuit 100, the circuit configuration is symmetrical between the switch 16 side and the switch 18 side via the motor 20. Thus, when the terminal 16A and the terminal 16C of the switch 16 are connected and the terminal 18A and the terminal 18C of the switch 18 are connected, the transistor 42 and the resistor 58 provide the same action as the transistor 44 and the resistor 66. For this reason, the same effects can be obtained even when the door mirror 26 is deployed from the storage position.

Fourth Embodiment

Next, a fourth embodiment of the invention will be described.

Figure 9:
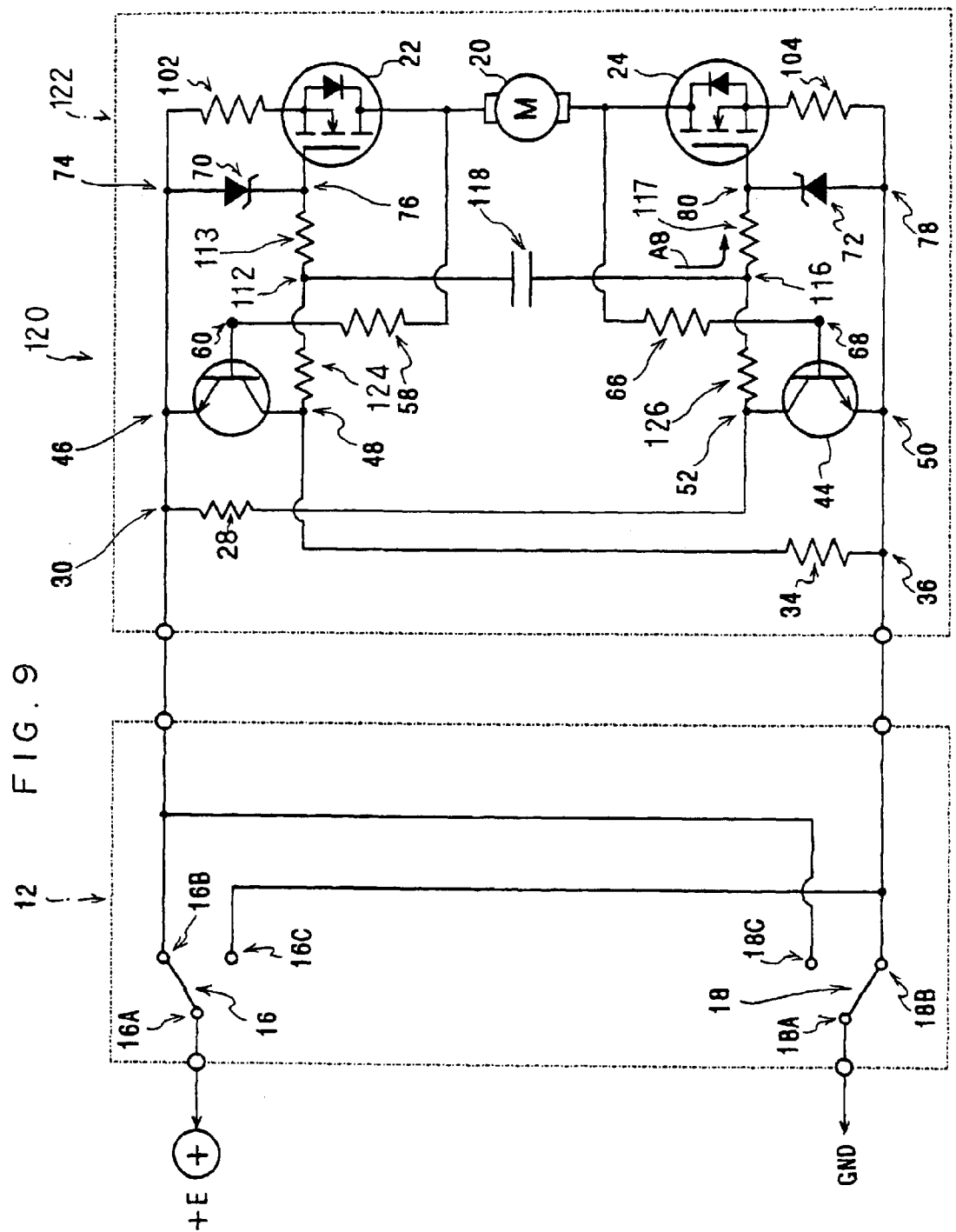
FIG. 9 is a circuit diagram of a mirror device motor control circuit pertaining to a fourth embodiment of the present invention.

In FIG. 9, a circuit diagram of a mirror device motor control circuit 120 (referred to below simply as "the control circuit 120") pertaining to the fourth embodiment of the invention is illustrated.

As will be understood by comparing this diagram with FIG. 7, in a drive control section 122 of the present control circuit 120, the other end of the resistor 28 (end portion opposite from the contact point 30) and the other end of the resistor 34 (end portion opposite from the contact point 36) are not connected in comparison to the third embodiment; rather, the other end of the resistor 28 is connected to the contact point 52, and the other end of the resistor 34 is connected to the contact point 48. However, although there is a difference in configuration with respect to the above point, the operation of the circuit is the same as that of the configuration where the other end of the resistor 28 and the other end of the resistor 34 are connected.

Also, in the present control circuit 120, a resistor 124 is disposed in place of the diode 106, and a resistor 126 is disposed in place of the diode 108. Moreover, in the present control circuit 120, the resistors 110 and 114 are not disposed, the contact points 54 and 112 at both ends of the resistor 110 in the third embodiment are not connected and, similarly, the contact points 62 and 116 at both ends of the resistor 114 are not connected (in FIG. 9, the contact points 58 and 62 are omitted because the resistors 110 and 114 are not present).

As described above, the diodes 106 and 108 are disposed in the control circuit 100 of the third embodiment so that, when the transistors 42 and 44 are switched to the ON state, the currents that are supposed to proceed to the gate terminals of the MOSFETs 22 and 24 are prevented from being grounded via the collector terminals and emitter terminals of the transistors 42 and 44.

With respect thereto, although the diodes 106 and 108 are not disposed in the present control circuit 120, the resistors 124 and 126 are disposed so that, even when the transistors 42 and 44 are switched to the ON state, set currents can be applied to the gate terminals of the MOSFETs 22 and 24. That is, although there is a difference in configuration with respect to the above point, the present control circuit 120 fundamentally provides the same action as the control circuit 100 of the third embodiment, and the same effects can be obtained.

Moreover, as described above, although the resistors 124 and 126 are disposed in the present control circuit 120, the resistors 110 and 114 and the diodes 106 and 108 are not disposed. Thus, the number of parts can be substantially reduced by the amount of the diodes 106 and 108, so that there is also the advantage that costs can be lowered.

Fifth Embodiment

Next, a fifth embodiment of the invention will be described.

Figure 10:
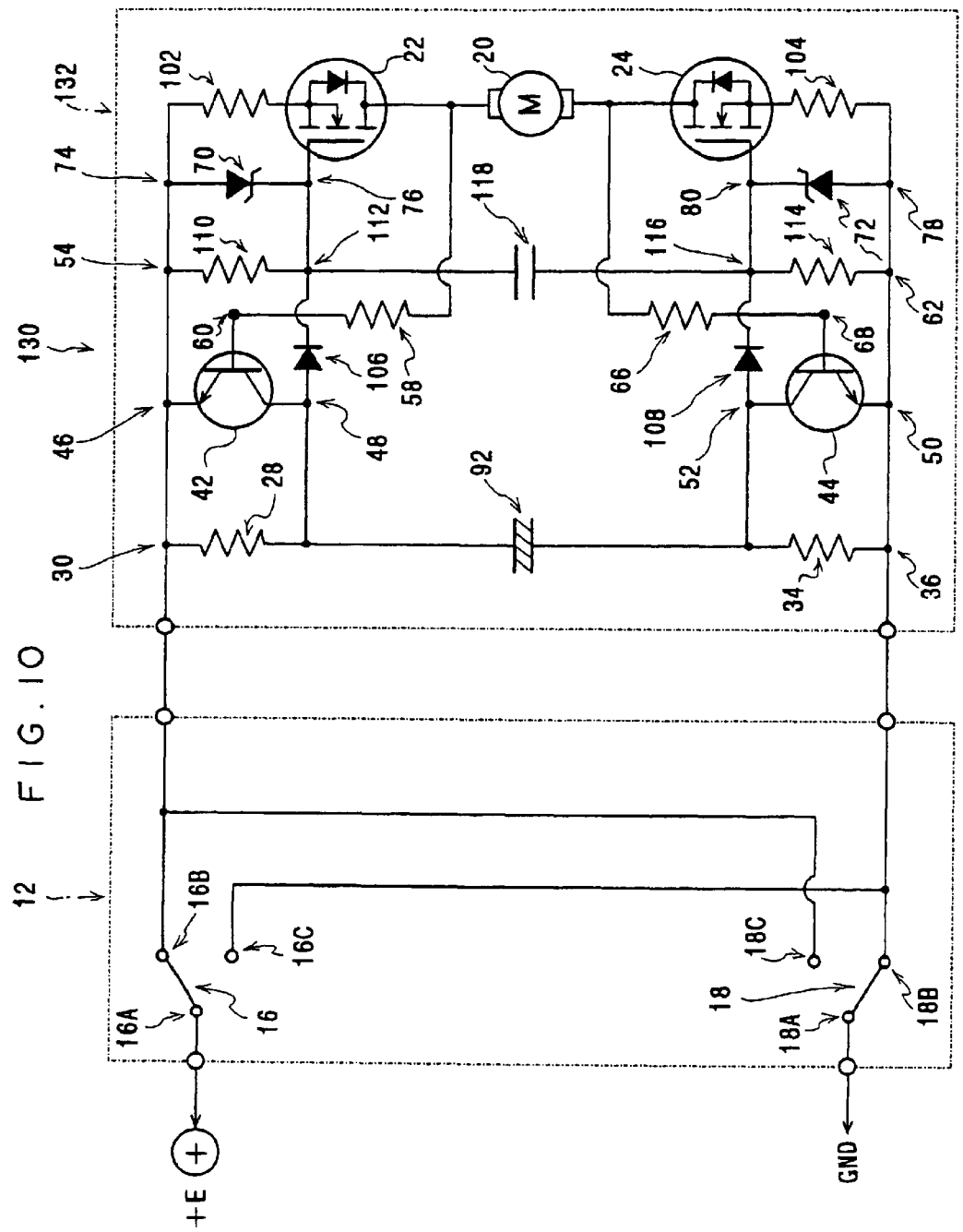
FIG. 10 is a circuit diagram of a mirror device motor control circuit pertaining to a fifth embodiment of the present invention.

In FIG. 10, a circuit diagram of a mirror device motor control circuit 130 (referred to below simply as "the control circuit 130") pertaining to the fifth embodiment of the invention is illustrated.

As illustrated in this diagram, the configuration of the present control circuit 130 is fundamentally the same as that of the third embodiment, but is different from that of the third embodiment in that, similar to the second embodiment, a drive control section 132 is disposed with the capacitor 92.

Because the present control circuit 130 of the above configuration fundamentally has the same configuration as the control circuit 100 pertaining to the third embodiment, the control circuit 130 provides the same action as that of the third embodiment, and the same effects can be obtained.

Figure 11:
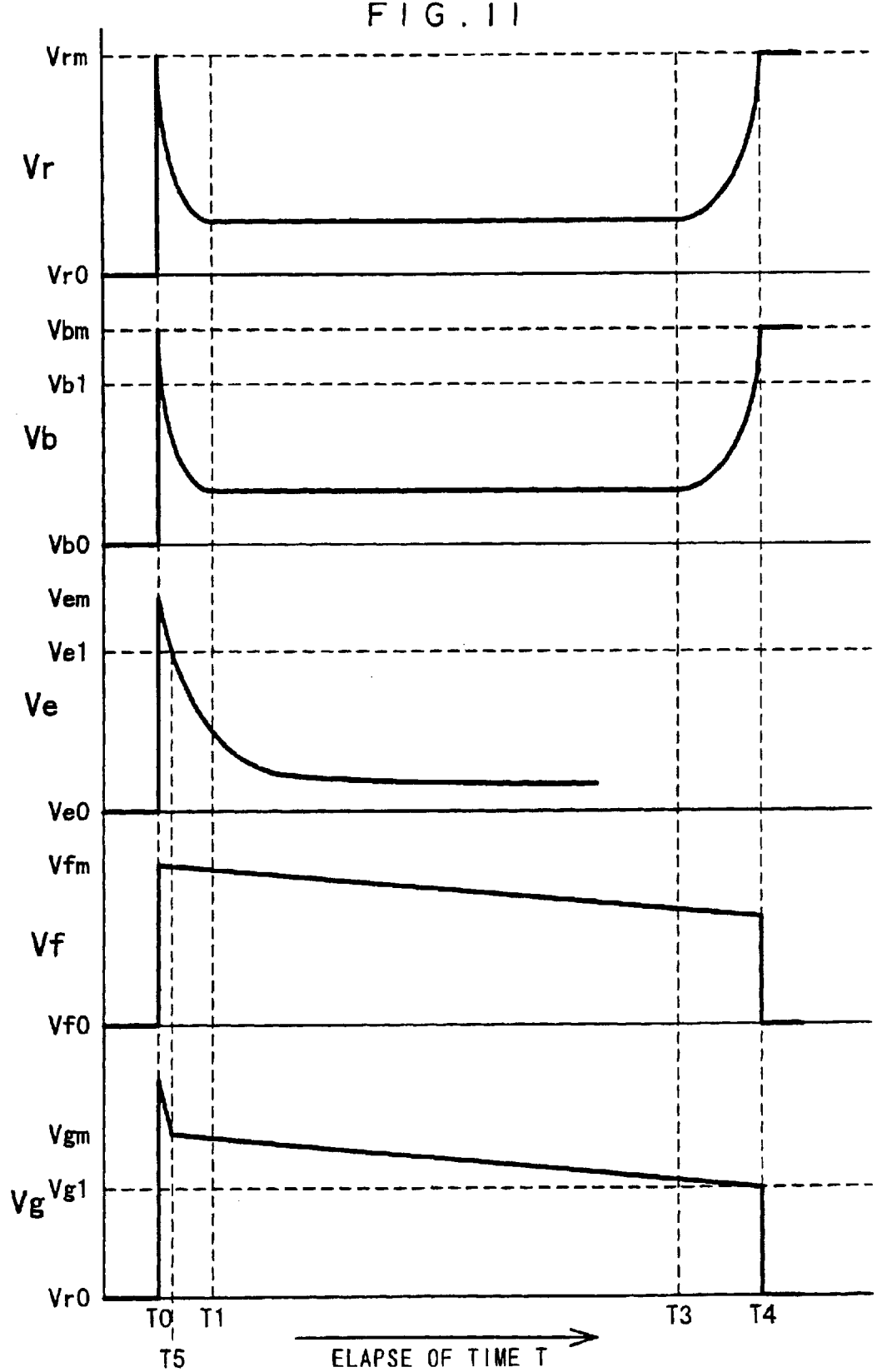
FIG. 11 is a time chart showing waveforms of voltages applied to each of a third terminal of a drive current controlling transistor and a sixth terminal of a switching transistor.

Also, because the control circuit 130 is, similar to the control circuit 90 pertaining to the second embodiment, disposed with the capacitor 92, when the terminal 16A and the terminal 16B of the switch 16 are connected and the terminal 18A and the terminal 18B of the switch 18 are connected, the voltage between both ends of the resistor 34 gradually decreases in accompaniment with the elapse of time due to the action of the capacitor 92, as shown in the time chart of FIG. 11. Because the voltage corresponding to the voltage between both ends of the resistor 34 is applied to the gate terminal of the MOSFET 24, the voltage applied to the gate terminal of the MOSFET 24 also naturally gradually decreases in accompaniment with the elapse of time. Thus, when the voltage Vg becomes equal to or less than the predetermined value, between the drain terminal and the source terminal of the MOSFET 24 is switched to an OFF state. Thus, in this state, conduction to the motor 20 is forcibly cut off, the driving of the motor 20 is stopped, and the door mirror 26 stops rotating at the storage position.

That is, the present control circuit 130 also provides the same action as that of the second embodiment, and the same effects can be obtained.

Sixth Embodiment

Next, a sixth embodiment of the invention will be described.

Figure 12:
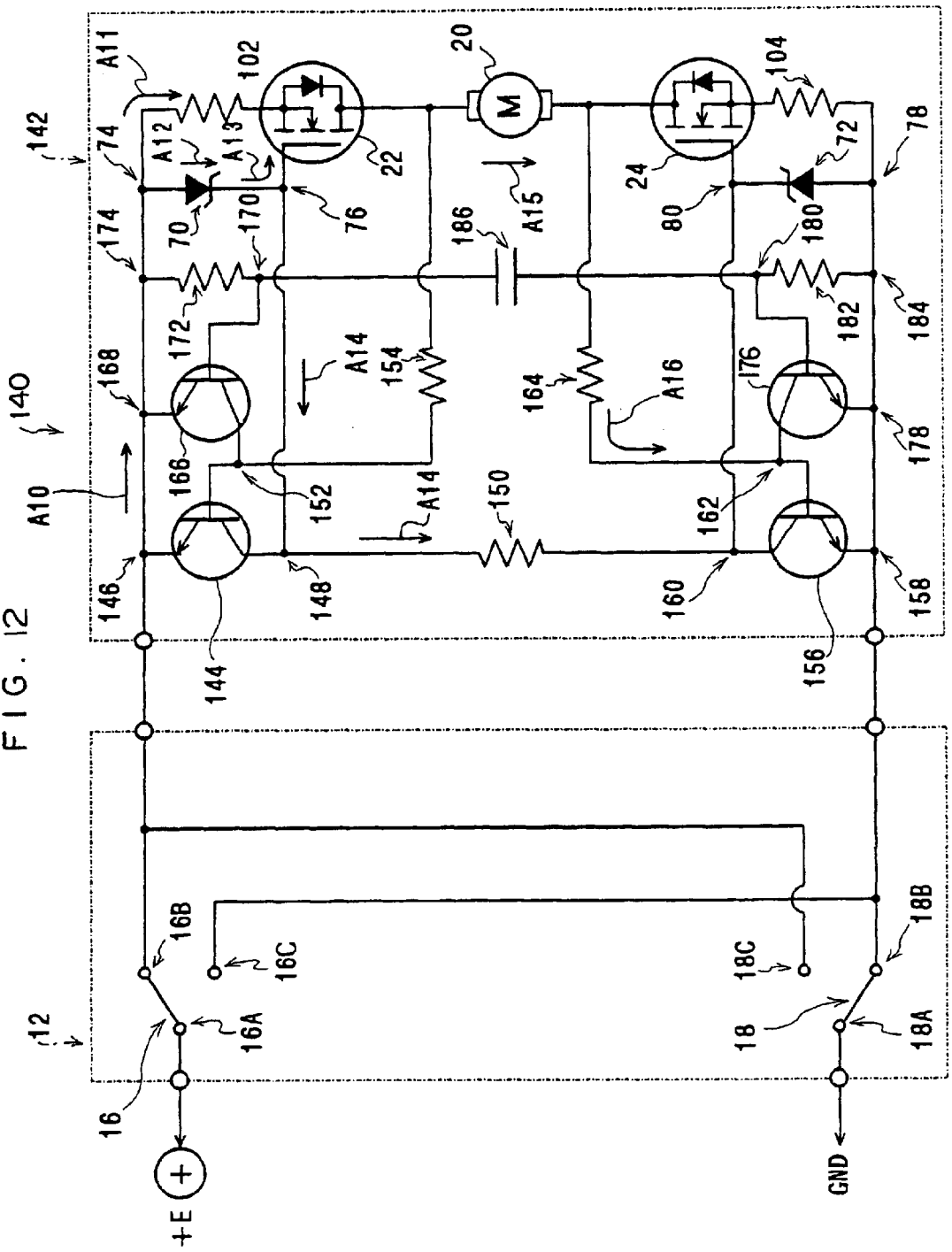
FIG. 12 is a circuit diagram of a mirror device motor control circuit pertaining to a sixth embodiment of the present invention.

In FIG. 12, the configuration of a mirror device motor control circuit 140 (referred to below simply as "the control circuit 140") pertaining to the sixth embodiment of the invention is illustrated by a circuit diagram.

As illustrated in this diagram, a drive control section 142 of the present control circuit 142 is disposed with a transistor 144 serving as a switching transistor. In the transistor 144, an emitter terminal serving as a fifth terminal is connected to a contact point 146 between the contact point 74 and a terminal 16B. Also, a collector terminal serving as a fourth terminal of the transistor 144 is connected to a contact point 148. The contact point 148 is connected to an end of a resistor 150 and directly connected to the contact point 76.

Moreover, a base terminal serving as a sixth terminal of the transistor 144 is connected to a contact point 152. The contact point 152 is connected between the drain terminal of the MOSFET 22 and the motor 20 via a resistor 154.

The present control circuit 140 is disposed with a transistor 156 serving as a switching transistor. In the transistor 156, an emitter terminal serving as a fifth terminal is connected to a contact point 158 between the contact point 78 and a terminal 18B. Also, a collector terminal serving as a fourth terminal of the transistor 156 is connected to a contact point 160. The contact point 160 is connected to the other end of the resistor 150 and directly connected to the contact point 80.

Moreover, a base terminal serving as a sixth terminal of the transistor 156 is connected to a contact point 162. The contact point 162 is connected between the drain terminal of the MOSFET 24 and the motor 20 via a resistor 164.

Moreover, the present control circuit 140 is disposed with a transistor 166 configuring a bypass component. In the transistor 166, an emitter terminal is connected to a contact point 168 between the contact point 74 and the contact point 146, and a collector terminal is connected to the contact point 152. Also, a base terminal of the transistor 166 is connected to a contact point 170. An end of a resistor 172 configuring a bypass component is connected to the contact point 170. The other end of the resistor 172 is connected to a contact point 174 between the contact point 74 and the contact point 168.

The present control circuit 140 is disposed with a transistor 176 configuring a bypass component. In the transistor 176, an emitter terminal is connected to a contact point 178 between the contact point 78 and the contact point 158, and a collector terminal is connected to the contact point 162. Also, a base terminal of the transistor 176 is connected to a contact point 180. An end of a resistor 182 configuring a bypass component is connected to the contact point 180. The other end of the resistor 182 is connected to a contact point 184 between the contact point 78 and the contact point 178.

Moreover, an end of a capacitor 186 configuring a bypass component is connected to the contact point 170, and the other end of the capacitor 186 is connected to the contact point 180.

Action and Effects of the Sixth Embodiment

In the present control circuit 140 of the above configuration, when the terminal 16A and the terminal 16B of the switch 16 are connected and the terminal 18A and the terminal 18B of the switch 18 are connected, a current A10 flows. The current A10 is separated at the contact point 74 into a current A11, which proceeds to the MOSFET 22 via the resistor 102, and a current A12, which flows through the zener diode 70.

The current A12 is separated at the contact point 76 into a current A13, which flows to the gate terminal of the MOSFET 22, and a current A14, which proceeds to the contact point 148. The current A14 flows to the gate terminal of the MOSFET 24 via the resistor 150 and the contact points 160 and 80. Similar to the first embodiment, as long as the voltage Vg of the current A14 flowing to the gate terminal of the MOSFET 24 is equal to or greater than the predetermined value Vg1, between the drain terminal and the source terminal of the MOSFET 24 becomes conductive. Thus, a current A15 serving as the drive current of the motor 20 flows, the motor 20 is driven, and the door mirror 26 is rotated in the storage direction by this driving force.

Also, part of the current A15 flowing through the motor 20 becomes a current A16 flowing to the base terminal of the transistor 156 via the resistor 164 and the contact point 162, and the voltage Vb corresponding to the current A16 is applied to the base terminal of the transistor 156.

Thus, similar to the preceding embodiments, the lock current flows to the motor 20, so that when the voltage Vb corresponding to the current A16 reaches the specific value Vbm, between the collector terminal and the emitter terminal of the transistor 156 becomes conductive, and the current A14 is grounded from the contact point 160 via the collector terminal and the emitter terminal of the transistor 156. Thus, the voltage Vg applied to the gate terminal of the MOSFET 24 becomes equal to or less than the predetermined value Vg1, conduction between the drain terminal and the source terminal of the MOSFET 24 is released, and conduction to the motor 20 is cut off.

In the present control circuit 140, as described above in the preceding embodiments, the inrush current flows at the time driving of the motor 20 is initiated. The inrush current flowing through the motor 20 proceeds to the contact point 162 via the resistor 164.

Incidentally, the inrush current also flows from the contact point 174 to the resistor 182 via the resistor 172 and the capacitor 186, is separated from the contact point 180 between the capacitor 186 and the resistor 182, and also flows to the base terminal of the transistor 176.

Thus, the voltage corresponding to the large substantially pulse-like inrush current is extemporaneously applied to the base terminal of the transistor 176, whereby the collector terminal and the emitter terminal of the transistor 176 become conductive (i.e., are switched to the ON state). The collector terminal and the emitter terminal of the transistor 176 become conductive, whereby the inrush current proceeding from the resistor 164 to the contact point 162 is fundamentally grounded via the collector terminal and the emitter terminal of the transistor 176 and does not flow to the base terminal of the transistor 156 or, even if it does flow to the base terminal of the transistor 156, the voltage Vb corresponding to the current flowing to the base terminal does not reach the specific value Vbm. Thus, in this state, between the collector terminal and the emitter terminal of the transistor 156 is not conductive.

In this manner, in the present control circuit 140, because between the collector terminal and the emitter terminal of the transistor 156 is not conductive even if the inrush current flows, the driving of the motor 20 can be reliably initiated.

Also, because an integration circuit is configured by the capacitor 186 and the resistor 182, the voltage between the capacitor 186 and the resistor 182 gradually drops in accompaniment with the elapse of time. Thus, the voltage applied to the base terminal of the transistor 176 also gradually drops in accompaniment with the elapse of time, conduction between the collector terminal and the emitter terminal of the transistor 176 is released, the current flowing through the resistor 164 flows to the base terminal of the transistor 156, and the voltage Vb corresponding to this is applied to the base terminal of the transistor 156.

For this reason, the voltage Vb of the specific value Vbm corresponding to the lock current is applied, whereby the current proceeding to the gate terminal of the MOSFET 24 can be grounded.

Similar to the preceding embodiments described up to now, the circuit configuration of the present control circuit 140 is also symmetrical between the switch 16 side (upper half of FIG. 12 via the motor 20) and the switch 18 side (lower half of FIG. 12 via the motor 20) via the motor 20. Thus, when the terminal 16A and the terminal 16C of the switch 16 are connected and the terminal 18A and the terminal 18C of the switch 18 are connected, the transistors 144 and 166 and the resistor 172 provide the same action as the transistors 156 and 176 and the resistor 182, and the same effects can be obtained.

What is claimed is:

1. A control circuit that is used in a mirror device, where the position of a mirror attached to a vehicle is changed in a predetermined direction by the driving force of a motor, and controls electrical power supplied to the motor, the control circuit comprising:

- a drive current controlling transistor where, when a first terminal is connected to a power source, a second terminal is connected to the motor and a voltage equal to or greater than a predetermined value is applied to a third terminal that is different from both the first and second terminals, a current flows from the first terminal to the second terminal and application of the voltage is released, whereby the current is blocked; and
- a switching transistor where a fourth terminal is connected between the power source and the third terminal, a fifth terminal is grounded, and which includes a sixth terminal connected to the motor at an opposite side from the second terminal, and a voltage equal to or greater than a specific value corresponding to a lock current flowing through the motor is applied to the sixth terminal, whereby the fourth terminal and the fifth terminal are switched to a conductive state and the voltage applied to the third terminal is made less than the predetermined value.

2. The control circuit of claim 1, wherein the drive current controlling transistor is a field-effect transistor.

3. The control circuit of claim 1, wherein the control circuit is symmetrically configured via the motor.

4. The control circuit of claim 1, further comprising a waveform conversion component that converts the waveform of the voltage applied to the sixth terminal, lowers a maximum value of an output voltage lower than a maximum value of a substantially pulse-like voltage equal to or greater than the inputted specific value, and inputs the maximum value to the sixth terminal.

5. The control circuit of claim 4, wherein the waveform conversion component is configured by a capacitor and a resistor.

6. The control circuit of claim 1, further comprising a compensation component that lowers, in accompaniment with the elapse of time, the voltage equal to or greater than the predetermined value on the basis of a current corresponding to the pulse-like voltage in a state where the pulse-like voltage equal to or greater than the specific value is applied to the sixth terminal.

7. The control circuit of claim 6, wherein the compensation component is configured by a resistor and a capacitor.

8. The control circuit of claim 1, further comprising a bypass component where a voltage corresponding to the pulse-like current equal to or greater than the specific value is lowered in accompaniment with the elapse of time and applied, is switched to an ON state and grounds the pulse-like current proceeding to the third terminal before transmitting the pulse-like current to the third terminal.

9. The control circuit of claim 8, wherein the bypass component is configured by a transistor, a resistor and a capacitor.

10. The control circuit of claim 1, further comprising a storage element, wherein the storage element stores a charge due to the current flowing to the third terminal and reduces the current flowing to the third terminal in accordance with the amount of the stored charge.

11. The control circuit of claim 10, wherein the storage element is a capacitor.

* * * * *